(12) United States Patent
Berres

(10) Patent No.: US 8,188,834 B2
(45) Date of Patent: May 29, 2012

(54) DEVICE FOR DETECTING THE LOCATION OF A COMPRESSION POINT

(75) Inventor: Stefan Berres, Wallduern (DE)

(73) Assignee: Hoffmann + Kripper GmbH, Buchen (DE)

( * ) Notice: Subject to any disclaimer, the term of this patent is extended or adjusted under 35 U.S.C. 154(b) by 532 days.

(21) Appl. No.: 12/319,797

(22) Filed: Jan. 12, 2009

(65) Prior Publication Data
US 2009/0195347 A1    Aug. 6, 2009

(30) Foreign Application Priority Data

Jan. 15, 2008   (DE) .......................... 10 2008 004 347

(51) Int. Cl.
*H01C 10/12* (2006.01)
(52) U.S. Cl. ........................................ 338/114; 338/99
(58) Field of Classification Search .................. 338/99, 338/114, 115, 176, 92, 95; 200/510–512
See application file for complete search history.

(56) References Cited

U.S. PATENT DOCUMENTS

| | | | | |
|---|---|---|---|---|
| 4,494,105 A * | 1/1985 | House | ........................... | 338/114 |
| 4,651,123 A * | 3/1987 | Zepp | ............................ | 338/176 |
| 5,334,967 A * | 8/1994 | Paszkiewicz | ................... | 338/95 |
| 5,876,106 A * | 3/1999 | Kordecki | ......................... | 362/29 |
| 5,945,929 A * | 8/1999 | Westra | ............................ | 341/34 |
| 5,999,083 A * | 12/1999 | Kordecki | ........................ | 338/47 |
| 6,069,552 A * | 5/2000 | Van Zeeland | ................... | 338/92 |
| 6,137,072 A * | 10/2000 | Martter et al. | ................ | 200/512 |
| 6,400,246 B1 * | 6/2002 | Hill et al. | ....................... | 335/205 |
| 6,531,951 B2 * | 3/2003 | Serban et al. | .................... | 338/47 |

FOREIGN PATENT DOCUMENTS

| | | |
|---|---|---|
| DE | 43 35 004 A1 | 4/1995 |
| DE | 200 13 047 U1 | 11/2000 |
| DE | 100 60 013 A1 | 2/2002 |
| WO | PCT/US2006/029270 | 2/2007 |

\* cited by examiner

*Primary Examiner* — Kyung Lee
(74) *Attorney, Agent, or Firm* — Galgano & Associates, PLLC; Thomas M. Galgano; Jessica G. Bower

(57) ABSTRACT

The device has a first substrate on which an electrical resistive element is mounted, and a second substrate on which a contact electrode is mounted. The contact electrode is disposed opposite the resistive element at an electrically insulating distance. It can be brought into electrical contact with the resistive element by pressing the substrates together. The device is provided with electrical or electronic circuitry for detecting the location of the compression point. At least one of the substrates is equipped with a flat leaf spring of spring-grade sheet metal attached flush thereto, which leaf covers the compression zone of the substrates.

19 Claims, 6 Drawing Sheets

DEVICE FOR DETECTING THE LOCATION OF A COMPRESSION POINT

FIELD OF THE INVENTION

The invention relates to a device for detecting the location of a compression point, with a first substrate on which an electrical resistive element is mounted, with a second substrate on which a contact electrode is mounted, which electrode is disposed opposite the resistive element at an electrically insulating distance and can be brought into electrical contact with the resistive element by pressing the substrates together, and with an electrical or electronic circuit for detecting the location of the compression point.

BACKGROUND OF THE INVENTION

From DE 4335004 A1, DE 20013047 U1 and DE 10060013 A1 there are known what are called film potentiometers. In these potentiometers, the substrates of the resistive elements and of the contact electrodes are made of film material. Between the substrates there is mounted a spacer of film material, thereby creating the insulating distance between the resistive element and the contact electrode.

To actuate a film potentiometer, the substrates of the resistive element and of the contact electrode are pressed together. This is usually done by pressing down on the substrate of the contact electrode, which for this purpose can be actuated by the finger or urged by a plunger.

When the substrates of the resistive element and contact electrode are pressed together, dimples are formed in the film material, which dimples recover only slowly and sometimes not completely. All common film material have a more or less pronounced temperature dependence in their recovery behavior, the film becoming more plastic with higher temperatures. Because of the temperature dependence of the recovery behavior, the linearity of the potentiometer can be impaired.

In a pressure-actuated potentiometer according to WO 2007/016281 A2, a shielding material is fastened to the surface on which actuating pressure is exerted. This material is supposed to improve the functional performance and reliability of the potentiometer in the high-temperature range and under the wear conditions to which the potentiometer is subjected by the actuating pressure. Boron silicate and glass fibers are mentioned as particularly durable and heat-resisting shielding materials.

SUMMARY OF THE INVENTION

It is an object of the invention to improve the elastic recovery behavior of a device of the type mentioned in the Background of the Invention and to make it less temperature-dependent.

This object is achieved according to the present invention by the provision of a device wherein at least one of the substrates of the resistive element and/or contact electrode is equipped with a flat leaf spring of spring-grade sheet metal, which is mounted flush thereon and which covers the compression zone of the substrates.

The leaf spring functions as mechanical protection for the device. During actuation of this device when the substrates are pressed together, this leaf spring is deformed together with the device. The additional mounting of the leaf spring may therefore indeed increase the necessary actuating force. However, the switching threshold of the device can be set more precisely, and the size of the contact zone between resistive element and contact electrode is potentially increased and the switching behavior of the device is smoother. Furthermore, the leaf spring mounted flush on the substrate of film material acts very effectively as a restoring spring, which promptly eliminates the dimples formed during actuation of the device and also has no noteworthy temperature dependence. The linearity of the device is therefore stable with respect to temperature or is not notably impaired by temperature influences.

The leaf spring is made of spring-grade sheet metal, especially sheet steel, of well-defined thickness. It can have various geometric shapes and sizes.

In a preferred embodiment, the leaf spring is mounted in the form of a cover on the outer side of a substrate turned away from the other substrate. However, the leaf spring can also be mounted on the inner side of a substrate turned toward the other substrate.

In a preferred embodiment, at least one of the substrates of the resistive element and contact electrode is made of film material. The substrate made of film material is equipped with a leaf spring.

In a preferred embodiment, at least one of the substrates of the resistive element and contact electrode is a printed-circuit board.

In a preferred embodiment, the substrates of the resistive element and contact electrode are both made of film material. Between the substrates there is mounted a spacer, which forms the insulating distance between the resistive element and the contact electrode. This structure corresponds to that of a film potentiometer.

In a preferred embodiment, the spacer is made of film material, as are also the substrates of the resistive element and contact electrode. However, an impression on the substrate of the resistive element and/or contact electrode may also function as a spacer.

Conventional film potentiometers can be equipped with the leaf spring during manufacture or else retrofitted with the leaf spring. The leaf spring can be mounted directly on the film potentiometer, for example by adhesive bonding. It prevents dimples in the film material and it ensures a well-defined restoring force. Fatigue phenomena of the films due to temperature and continuous load are compensated, and scratches and damage due to external influences are greatly reduced.

In a preferred embodiment, the substrate of the contact electrode is equipped with a leaf spring.

In a preferred embodiment, the substrate of the resistive element is equipped with a leaf spring.

In a preferred embodiment, the substrates of the resistive element and contact electrode are both equipped with a leaf spring.

In a preferred embodiment, the leaf spring is bonded adhesively to the substrate of the resistive element and/or contact electrode. Preferably the leaf spring occupies, at least approximately, the entire surface of the substrate except for a contact tab.

In a preferred embodiment, the leaf spring is fastened to the substrate of the resistive element and/or contact electrode with a shielding film.

If the leaf spring is disposed on the inner side of the substrate of the resistive element and/or contact electrode, it can also be fixed merely by being positioned.

The film material can be FR4, Kapton, PI or PET. However, other film materials with similar characteristics can also be considered.

In a preferred embodiment, the device is a potentiometer with a tapping electrode.

The contact electrode on the second substrate of the device can be used as the tapping electrode. Preferably in this case, the resistive element has an electrical bipolar connection to the first substrate and the contact electrode has an electrical monopolar connection to the second substrate.

However, the tapping electrode can also be mounted adjacent to the resistive element on the first substrate of the device, in such a way that the resistive element and tapping electrode preferably mesh with one another. Preferably in this case, the resistive element has an electrical bipolar connection to the first substrate and the tapping electrode has an electrical monopolar connection to the first substrate.

The device can be actuated with the finger, with a mechanical wiper or magnetically.

BRIEF DESCRIPTION OF THE DRAWINGS

The invention will be explained in more detail hereinafter by means of six exemplary embodiments illustrated in the drawing, wherein, in the form of perspective exploded diagrams.

DETAILED DESCRIPTION OF THE PREFERRED EMBODIMENTS

Figure 1:
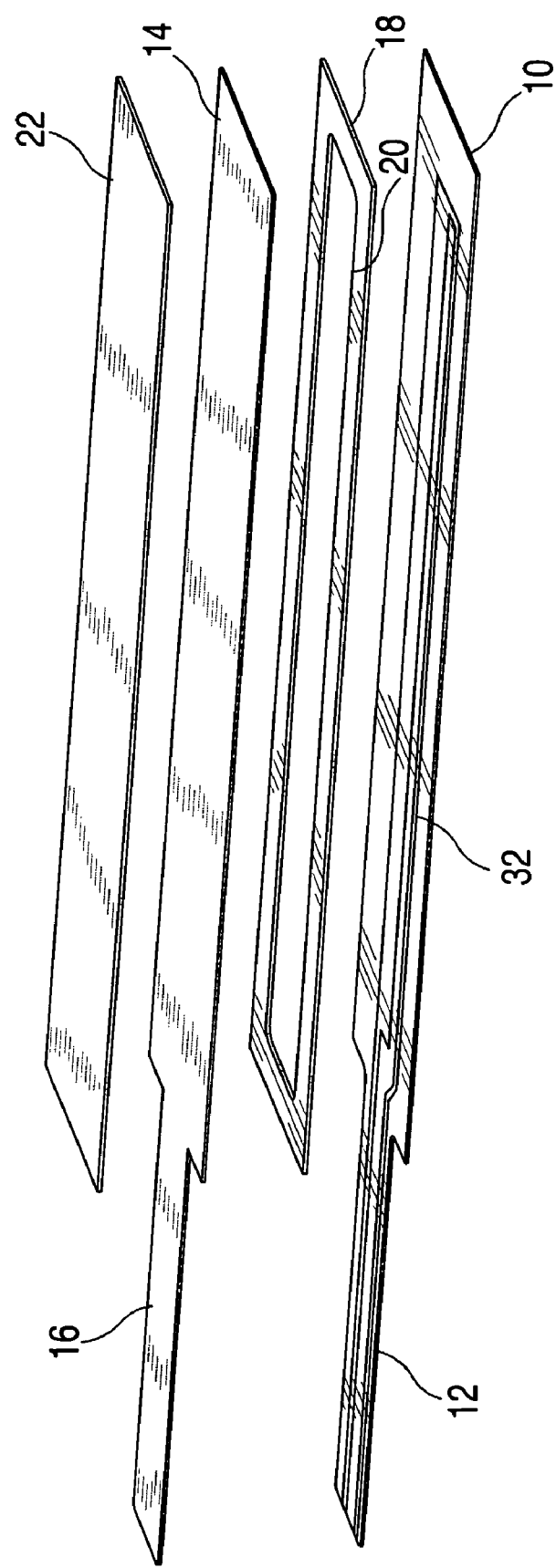
FIG. 1 shows a film potentiometer with a leaf spring adhesively bonded to the substrate of the contact electrode functioning as the tapping electrode.

The film potentiometer according to FIG. 1 has a substrate 10 for a resistive element 32, which is made of film material. Substrate 10 has the shape of an elongated rectangle, and resistive element 32 is straight. At the one narrow end of substrate 10 there protrudes in the prolongation thereof a somewhat narrower contact tab 12, which supports two parallel conductor tracks 36 for establishing bipolar contact with resistive element 32 at both ends.

Disposed opposite substrate 10 of resistive element 32 is a second substrate 14 of the same shape and size for a contact electrode, which functions as the tapping electrode of the potentiometer. Second substrate 14 is also made of film material. The contact electrode is straight. It extends, following the path of the resistive element, over the center of resistive element 32, and for the same length. At the same narrow end as that of first substrate 10, second substrate 14 has a contact tab 16, which supports one conductor track for establishing monopolar contact with the contact electrode. Contact tab 16 is somewhat narrower than second substrate 14, and it protrudes in the prolongation thereof.

Between substrates 10, 14 there is disposed a spacer 18 of film material. Spacer 18 has the same shape and size as substrates 10, 14. It has a central longitudinal slot 20 along which substrates 10, 14 can be pressed together, in order to bring resistive element 32 and the contact electrode into electrical connection with one another. In the uncompressed condition, resistive element 32 and the contact electrode face one another over an electrical insulating distance, which is ensured by the thickness of spacer 18.

On the outer side of substrate 14 of the contact electrode turned away from substrate 10 of resistive element 32 there is seated a strip 22 of spring-grade sheet steel, which has the shape of an elongated rectangle and is adhesively bonded flush with substrate 14 of the contact electrode. Strip 22 has the same shape and size as the latter substrate 14. It occupies the entire surface of substrate 14 and exposes only contact tab 16 thereof.

Figure 2:
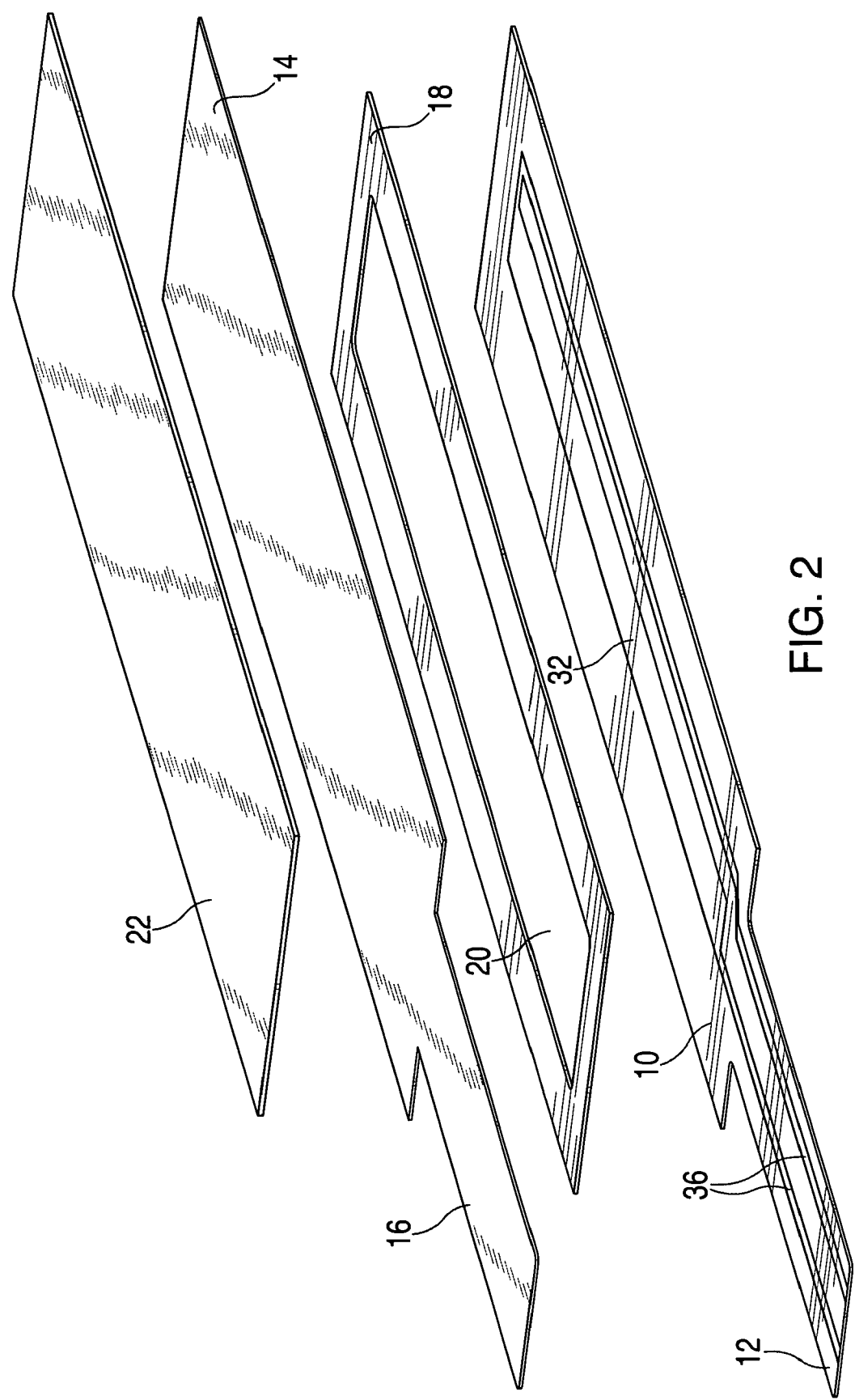
FIG. 2 shows a potentiometer, in which a printed-circuit board is provided as the substrate of the resistive element and a film as the substrate of the contact electrode functioning as the tapping electrode, and a leaf spring is adhesively bonded to the latter.

In the potentiometer according to FIG. 2, substrate 10 of resistive element 32 is a printed-circuit board. Otherwise the structure of the potentiometer corresponds to that of FIG. 1.

Figure 3:
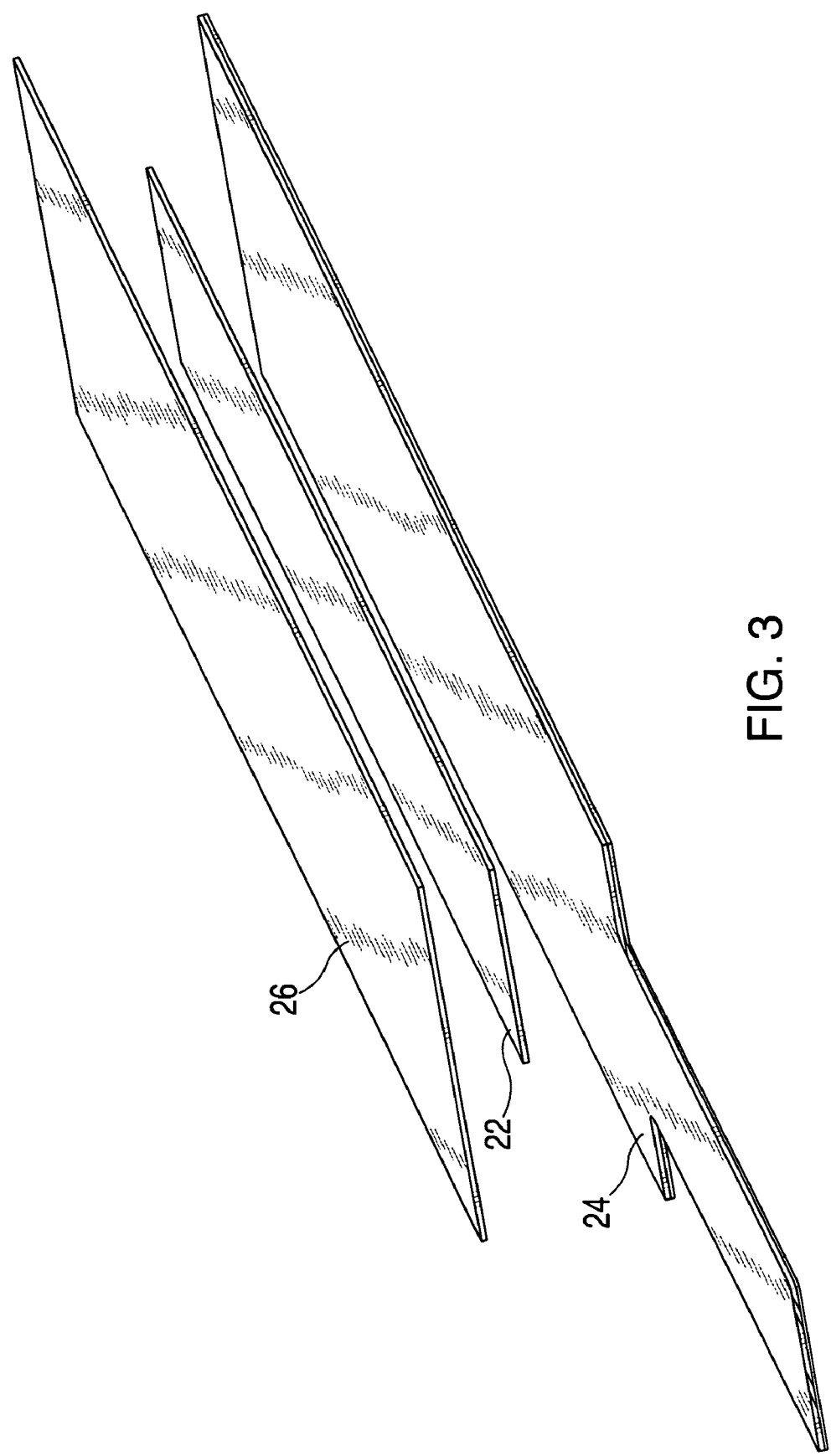
FIG. 3 shows a film potentiometer to which a leaf spring is fastened with a shielding film.

FIG. 3 shows a film potentiometer 24, in which rectangular leaf spring 22 is smaller in length and width than the rectangular surface of substrates 10, 14 of resistive element 32 and the contact electrode. Leaf spring 22 rests centrally on film potentiometer 24. It is held against film potentiometer 24 by a shielding film 26, which is rectangular in horizontal projection and corresponds in size to that of the rectangular surface of substrates 10, 14 of the resistive element and contact electrode.

Around leaf spring 22, shielding film 26 has a contact zone with film potentiometer 24, wherein there exists adherence—whether due to vacuum formed during application of shielding film 26, electrostatic forces, an intermediate layer of adhesive or the material composite obtained by heat-sealing of shielding film 26.

Figure 4:
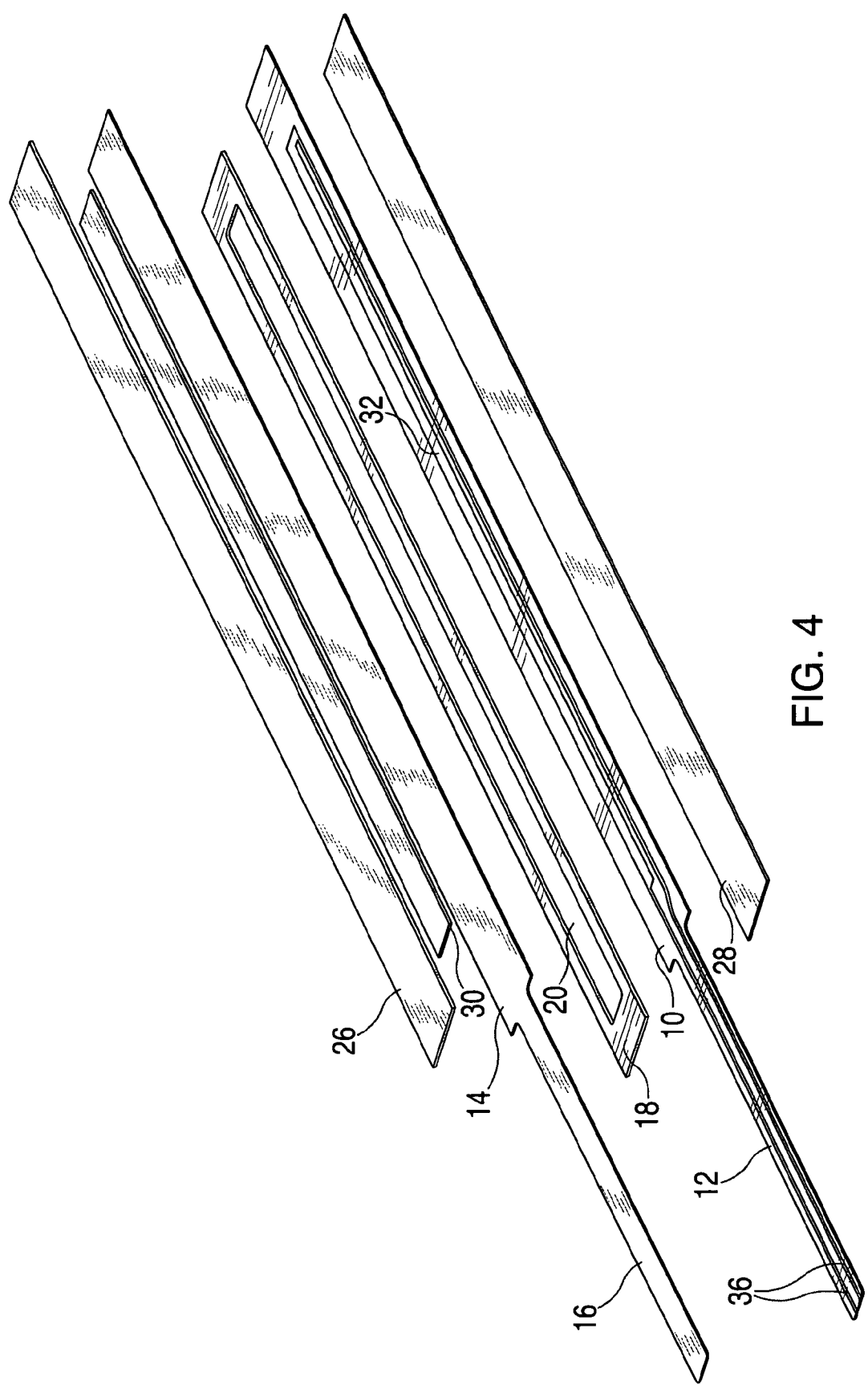
FIG. 4 shows a film potentiometer, in which the substrates of the resistive element and of the contact electrode functioning as the tapping electrode are equipped on the outside with leaf springs.

In the film potentiometer according to FIG. 4, substrates 10, 14 of resistive element 32 and the contact electrode are each equipped with a leaf spring 28, 30. Leaf spring 28 on substrate 10 of resistive element 32 has a rectangular surface of the same shape and size and is adhesively bonded thereto. Leaf spring 30 on substrate 14 of the contact electrode is smaller and is fastened thereto with a shielding film 26.

Figure 5:
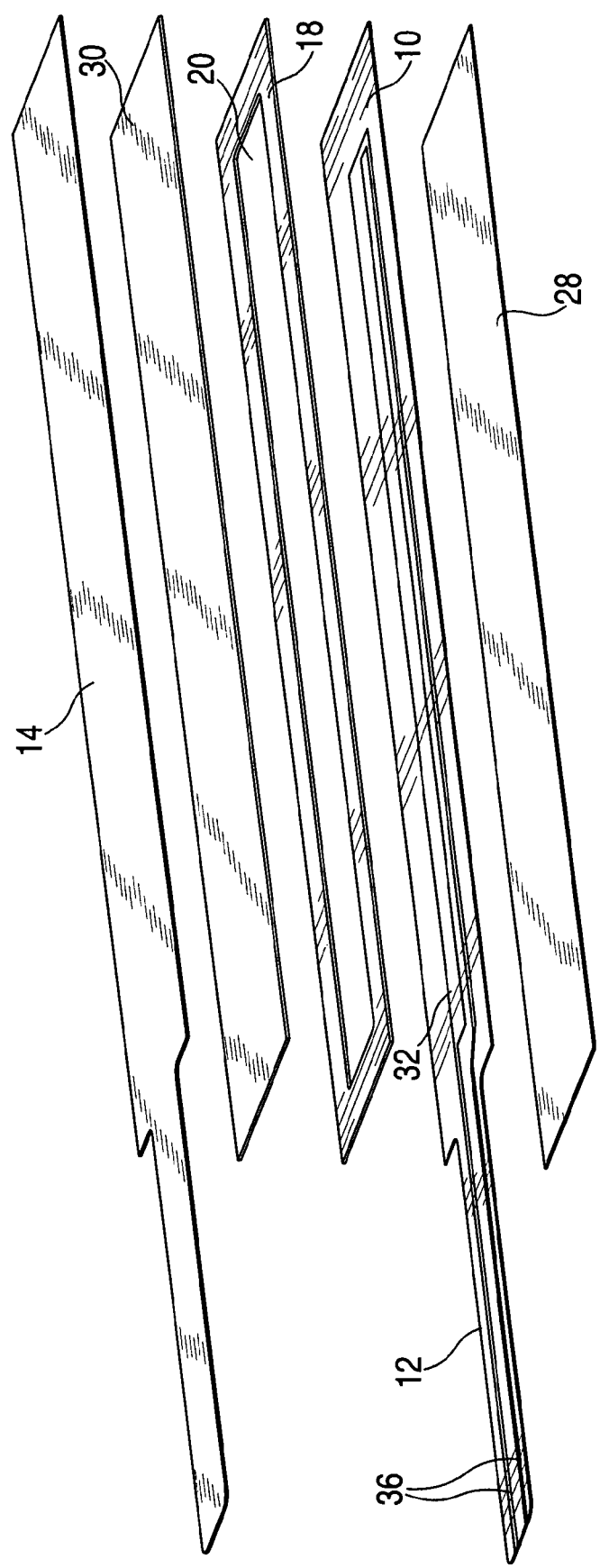
FIG. 5 shows a film potentiometer as in FIG. 4, in which the substrate of the contact electrode functioning as the tapping electrode is equipped on the inside with a leaf spring.

In the film potentiometer according to FIG. 5, substrate 14 of the contact electrode is equipped on the inner side with a leaf spring 30. The electrical contact is established via leaf spring 30.

Figure 6:
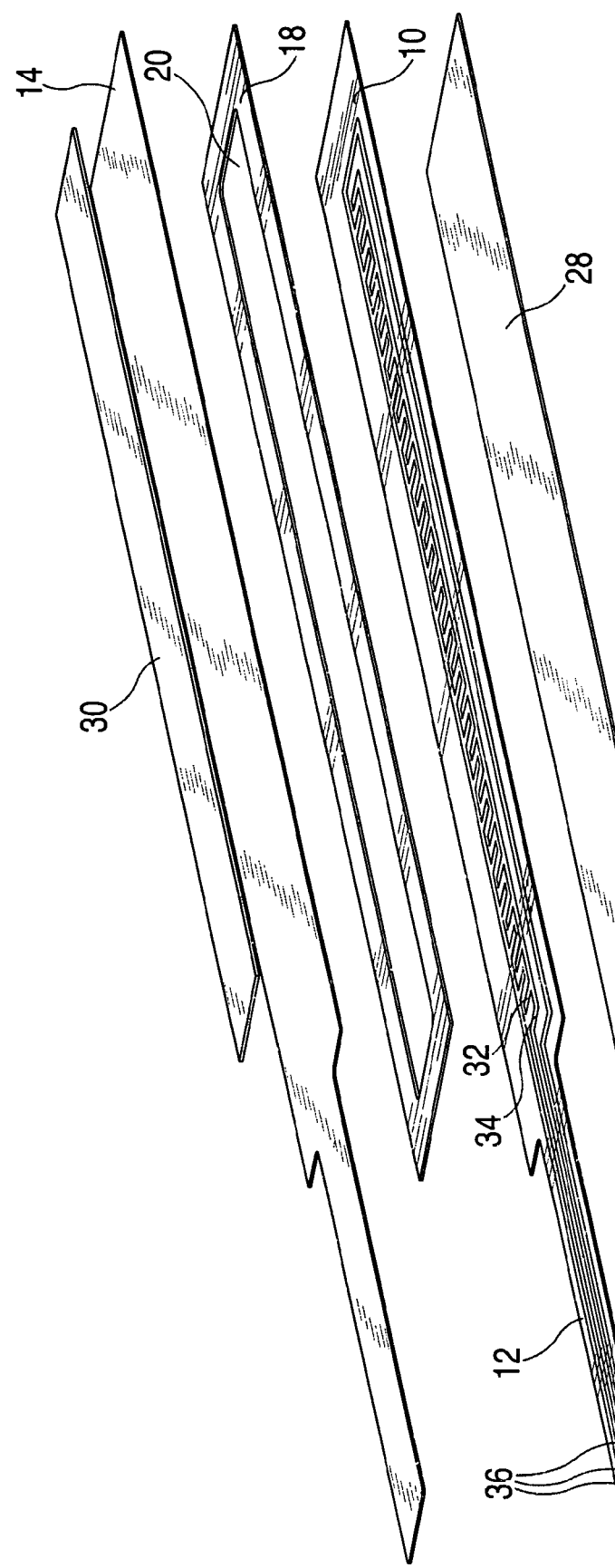
FIG. 6 shows a film potentiometer in which the tapping electrode is mounted on the substrate of the resistive element and one leaf spring each is adhesively bonded to the substrates of the resistive element and contact electrode.

In the film potentiometer according to FIG. 6, an electrical resistive element 32 and a tapping electrode 34 are mounted on a substrate 10, which has the shape of an elongated rectangle and is made of film material. Resistive element 32 has the form of a comb with narrow teeth and gaps between them. It has bipolar contact at both ends. Tapping electrode 34 forms a comb, whose teeth fit in the gaps between the teeth of resistive element 32. Tapping electrode 34 has monopolar contact at one end. For contacting, there protrudes from the one narrow end of substrate 10, in the prolongation thereof, a somewhat narrower contact tab 12, which supports three parallel conductor tracks 36.

Opposite substrate 10 of resistive element 32 and tapping electrode 34 there is disposed a second substrate 14 of the same shape and size for a contact electrode. Second substrate 14 is also made of film material. The contact electrode is straight. It extends centrally over resistive element 32 and tapping electrode 34.

The contact electrode is not electrically connected.

Between substrates 10, 14 there is disposed a spacer 18 of film material. Spacer 18 has the same shape and size as substrates 10, 14. It has a central longitudinal slot 20, along which substrates 10, 14 can be pressed together. At the compression point, this contact electrode represents an electrical connection between neighboring teeth of resistive element 32 and tapping electrode 34. In the uncompressed condition, substrates 10, 14 are disposed opposite one another at an electrical insulating distance, which is ensured by the thickness of spacer 18.

On the outer side of substrate 10 of resistive element 32 and tapping electrode 34 facing away from substrate 14 of the contact electrode there is adhesively bonded a leaf spring 28 having the shape of an elongated rectangle. Leaf spring 28 has the same shape and size as the rectangular surface of substrate 10. It occupies the entire surface of substrate 10 and exposes only contact tab 12.

To the outer side of substrate 14 of the contact electrode there is adhesively bonded a second leaf spring 30, which is narrower and shorter than substrate 14. Leaf spring 30 is placed centrally on the rectangular surface of substrate 14, so that it covers the compression zone of substrates 10, 14. Leaf spring 30 exposes tab 38 of second substrate 14.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. A device for detecting the location of a compression point, comprising:
   a first substrate on which an electrical resistive element is mounted;
   a second substrate on which a contact electrode is mounted, said contact electrode being disposed opposite said resistive element at an electrically insulating distance and can be brought into electrical contact with said resistive element by pressing said first and second substrates together;
   an electrical or electronic circuit for detecting the location of the compression point; and
   at least one flat leaf spring of spring-grade sheet metal, on at least one of said first and second substrates and which covers the compression zone of said first and second substrates.

2. The device according to claim 1, wherein said first and second substrates each have an outer side, and said leaf spring is mounted on said outer side of one of said first and second substrates turned away from the other of said first and second substrates.

3. The device according to claim 1, wherein said first and second substrates each have an inner side, and said leaf spring is mounted on said inner side of one of said first and second substrates turned toward the other of said first and second substrates.

4. The device according to claim 1, wherein at least one of said first and second substrates of said resistive element and said contact electrode is made of film material and is equipped with said leaf spring.

5. The device according to claim 1, wherein at least one of said first and second substrates of said resistive element and said contact electrode is a printed-circuit board.

6. The device according to claim 1, further comprising:
   a spacer mounted between said first and second substrates, wherein said spacer forms said electrically insulating distance between said resistive element and said contact electrode; and wherein said first and second substrates of said resistive element and said contact electrode are both made of film material.

7. The device according to claim 6, wherein said spacer comprises film material.

8. The device according to claim 6, wherein at least one of said second substrate of said contact electrode and said first substrate of said resistive element is equipped with said at least one leaf spring.

9. The device according to claim 8, wherein said leaf spring is bonded adhesively to at least one of said first substrate of said resistive element and said second substrate of said contact electrode.

10. The device according to claim 9, further comprising:
    a contact tab formed by a portion of said first substrate and said second substrate;
    wherein said leaf spring occupies at least approximately the entire surface of at least one of said first and second substrates of said resistive element and said contact electrode, except for said contact tab.

11. The device according to claim 1, further comprising:
    a shielding film, wherein said leaf spring is fastened to at least one of said first substrate of said resistive element and said second substrate of said contact electrode with said shielding film.

12. The device according to claim 1, wherein:
    said first substrate, said second substrate, said circuit and said at least one leaf spring collectively form a film potentiometer with a tapping electrode.

13. The device according to claim 12, wherein said contact electrode on said second substrate is said tapping electrode of said potentiometer.

14. The device according to claim 13, wherein said resistive element has an electrical bipolar connection to said first substrate and said contact electrode has an electrical monopolar connection to said second substrate.

15. The device according to claim 12, wherein said tapping electrode is mounted adjacent to said resistive element on said first substrate in such a way that said resistive element and said tapping electrode mesh with one another.

16. The device according to claim 15, wherein said resistive element has an electrical bipolar connection to said first substrate and said tapping electrode has an electrical monopolar connection to said first substrate.

17. The device according to claim 1, wherein said contact electrode is brought into electrical contact with said resistive element by manually pressing said first and second substrates together with a finger.

18. The device according to claim 1, further comprising:
    a mechanical wiper for bringing said contact electrode into electrical contact with said resistive element by pressing said first and second substrates together.

19. The device according to claim 1, further comprising:
    means for magnetic activation for bringing said contact electrode into electrical contact with said resistive element by pressing said first and second substrates together.

* * * * *